F. A. WUETIG.
POTATO-DIGGER.

No. 174,887. Patented March 14, 1876.

Attest.
Edward Barthel
Theo. S. Day

Inventor.
F. A. Wuetig
By Atty
Thos. S. Sprague

UNITED STATES PATENT OFFICE.

FRIEDRICH A. WUETIG, OF BLUE ISLAND, ILLINOIS.

IMPROVEMENT IN POTATO-DIGGERS.

Specification forming part of Letters Patent No. 174,887, dated March 14, 1876; application filed February 16, 1876.

*To all whom it may concern:*

Be it known that I, FRIEDRICH A. WUETIG, of Blue Island, in the county of Cook and State of Illinois, have invented an Improvement in Potato-Diggers, of which the following is a specification:

The nature of my invention relates to an improvement in devices for excavating potatoes, and at the same time to free them from earth and vines. To this end my invention consists in combining with an excavating-shovel, by means of two flexible steel straps, three rakes at the rear of the shovel, and at varying angles therewith, for breaking up the soil to free the tubers and to tear off their adhering vines.

Figure 1:
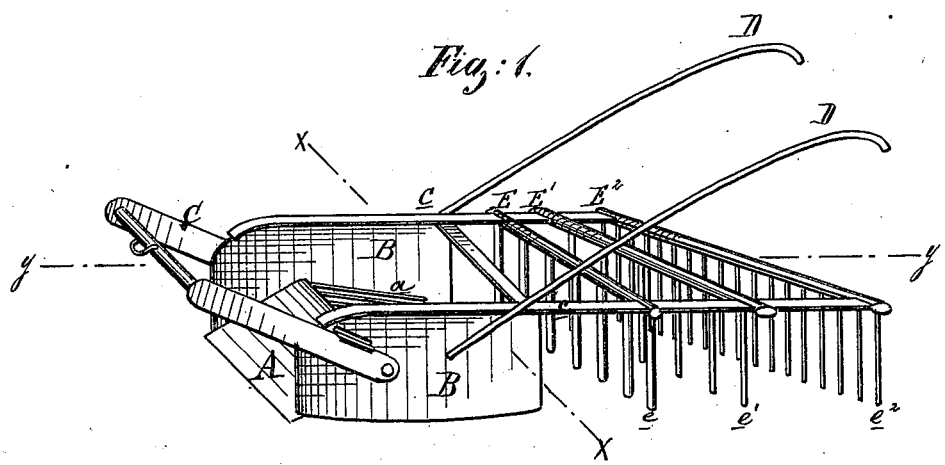
Figure 2:
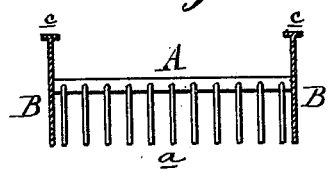
Figure 3:
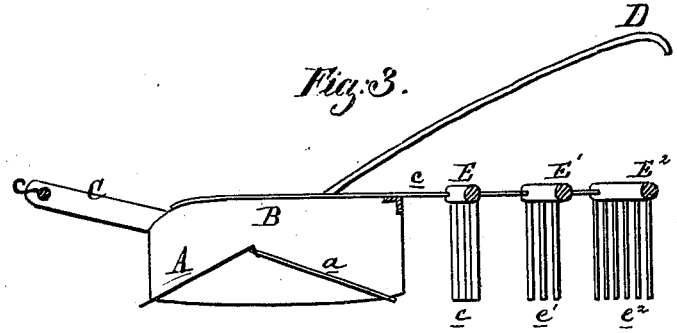

Figure 1 is a perspective view. Fig. 2 is a cross-section at $x\ x$. Fig. 3 is a longitudinal section at $y\ y$.

In the drawing, A represents an inclined shovel or excavator secured between two vertical land-sides, B B, to which is pivoted on the outside a draft-bail, C. $a$ are inclined bars, secured to the rear edge of the shovel, close enough together to prevent the potatoes from passing through between them, while they will permit the loose soil to sift through, the lumps and solid earth passing over the grating with the tubers and their adhering vines. D D are handles, secured to the land-sides, by means of which the operator can raise the rear end of the implement, so as to cause the shovel to take up the hills and their contents. E $E^1$ $E^2$ are rake-heads or harrow-bars, whose ends are secured by flexible steel straps $c\ c$ to the tops of the land-sides, and in the rear thereof. The first one, E, is arranged at a very acute angle with relation to the shovel, the second one, $E^1$, at a greater angle, and the last one, $E^2$, at angle of forty-five degrees, or thereabout. These bars are respectively provided with harrow-teeth $e\ e^1\ e^2$, the latter being placed quite close together.

The first rake or harrow breaks up the lumps of soil and frees it of its tubers, the second one tears off the vines, and the last one separates the vines and tubers and delivers the latter at one side.

The straps $c\ c$ are made flexible, so that the harrow-teeth may at all times drag upon the surface of the soil.

What I claim as my invention is—

The combination in a potato-digger, substantially as described, of the rakes or harrows E $E^1$ $E^2$, arranged at varying angles and connected by flexible straps to the land-sides B B, inclosing a shovel, A, and the inclined bars $d$, substantially as and for the purpose set forth.

FRIEDRICH A. WUETIG.

Witnesses:
 WM. H. LOTZ,
 WM. HOFFMANN.